(12) United States Patent
Do et al.

(10) Patent No.: US 12,697,783 B2
(45) Date of Patent: Aug. 4, 2026

(54) METHOD FOR MANUFACTURING A STRIP OF COMPOSITE MATERIAL INTENDED TO FORM A TUBULAR STRUCTURE AND CORRESPONDING INSTALLATION

(71) Applicant: TechnipFMC Subsea France, Courbevoie (FR)

(72) Inventors: Anh Tuan Do, Cormeilles en Parisis (FR); Laurent Juras, Orvault (FR); Richard Tomasi, Saint Etienne de Montluc (FR)

(73) Assignee: TechnipFMC Subsea France (FR)

( * ) Notice: Subject to any disclaimer, the term of this patent is extended or adjusted under 35 U.S.C. 154(b) by 79 days.

(21) Appl. No.: 18/857,748

(22) PCT Filed: Apr. 19, 2023

(86) PCT No.: PCT/EP2023/060104
§ 371 (c)(1),
(2) Date: Oct. 17, 2024

(87) PCT Pub. No.: WO2023/203061
PCT Pub. Date: Oct. 26, 2023

(65) Prior Publication Data
US 2025/0256465 A1 Aug. 14, 2025

(30) Foreign Application Priority Data
Apr. 20, 2022 (FR) ..................................... 22 03630

(51) Int. Cl.
| | |
|---|---|
| *B29C 65/36* | (2006.01) |
| *B29C 65/00* | (2006.01) |
| *B29K 27/00* | (2006.01) |
| *B29K 71/00* | (2006.01) |
| *B29K 307/04* | (2006.01) |

(52) U.S. Cl.
CPC ...... B29C 65/3684 (2013.01); B29C 66/1142 (2013.01); B29C 66/432 (2013.01);
(Continued)

(58) Field of Classification Search
CPC ......... B29C 63/10; B29C 65/02; B29C 65/08; B29C 65/103; B29C 65/1412;
(Continued)

(56) References Cited

U.S. PATENT DOCUMENTS

| | | | |
|---|---|---|---|
| 11,072,127 B2* | 7/2021 | Arcidiacono | ..... B29C 66/73752 |
| 11,685,125 B2 | 6/2023 | Glotin et al. | |

(Continued)

FOREIGN PATENT DOCUMENTS

| | | |
|---|---|---|
| EP | 3272508 B1 | 5/2019 |
| EP | 3475060 B1 | 12/2022 |

(Continued)

OTHER PUBLICATIONS

Patent family of EP3475060 (Year: 2026).*
(Continued)

*Primary Examiner* — Sonya M Sengupta
(74) *Attorney, Agent, or Firm* — OSTROLENK FABER LLP

(57) ABSTRACT

A method that includes:
butting together end regions of unconnected strip parts, and
applying heat and pressure to create a welded joint between the end regions;
at least one end region presents a rear zone and a front zone projecting from the rear zone, the front zone being delimited by two front zone lateral edges each presenting at least one point positioned at a distance from a respective extension of each lateral edge of the rear zone.
The front zone of an end region of a first strip part is situated facing an end region of a second strip part when the end regions are butted together.

16 Claims, 7 Drawing Sheets

(52) U.S. Cl.
CPC ...... *B29K 2027/16* (2013.01); *B29K 2071/00*
*(2013.01); *B29K 2307/04* (2013.01)

(58) Field of Classification Search
CPC ........... B29C 65/1432; B29C 65/1454; B29C
65/1632; B29C 65/1654; B29C 65/18;
B29C 65/32; B29C 65/3684; B29C
66/02241; B29C 66/1122; B29C 66/1142;
B29C 66/244; B29C 66/43; B29C 66/432;
B29C 66/5326; B29C 66/652; B29C
66/71; B29C 66/7212; B29C 66/72141;
B29C 66/73921; B29C 66/8161; B29C
66/8322; B29C 66/8362; B29C 66/919;
B29C 66/91933; B29C 70/32; B29K
2027/16; B29K 2027/18; B29K 2071/00;
B29K 2071/12; B29K 2079/085; B29K
2081/04; B29K 2081/06; B29K
2105/0079; B29K 2277/10; B29K
2307/04; B29K 2309/08; B29L 2007/007
See application file for complete search history.

(56) References Cited

U.S. PATENT DOCUMENTS

| | | | |
|---|---|---|---|
| 2014/0272243 A1 | 9/2014 | Sato et al. | |
| 2019/0210295 A1* | 7/2019 | Arcidiacono | ........... B29C 65/08 |
| 2025/0256465 A1* | 8/2025 | Do | ......................... B29C 65/32 |

FOREIGN PATENT DOCUMENTS

| | | | | | |
|---|---|---|---|---|---|
| JP | H11348125 A | 12/1999 | | | |
| WO | WO 9008027 A1 | 7/1990 | | | |
| WO | WO 2017/220327 A1 | 12/2017 | | | |
| WO | WO-2019210295 A1 * | 10/2019 | ............. | G06V 10/82 | |
| WO | WO 2020/016514 A1 | 1/2020 | | | |

OTHER PUBLICATIONS

Translation of WO-2019210295 (Year: 2019).*
International Search Report (ISR) mailed Jul. 28, 2023 in corresponding PCT International Application No. PCT/EP2023/060104.
Weiss, Michael, "Nahtloses Fugen von FV-Strukturen", ETH zurich. May 1, 2006 (May 1, 2006) (See ISR for Relevance).
Ed Herderick, PhD and George Ritter, PhD, "Joining of Advanced Thermoplastics", Jul. 23, 2012.
Anahi Pereira da Costa et al., "A Review of Welding Technologies for Thermoplastic Composites in Aerospace Applications", J. Aerosp. Technol. Manag., São José dos Campos, vol. 4, No. 3, pp. 255-265, Jul.-Sep. 2012.

* cited by examiner

METHOD FOR MANUFACTURING A STRIP OF COMPOSITE MATERIAL INTENDED TO FORM A TUBULAR STRUCTURE AND CORRESPONDING INSTALLATION

CROSS-REFERENCE TO RELATED APPLICATIONS

The present application is a 35 U.S.C. §§ 371 national stage application of International Application No. PCT/EP2023/060104, filed Apr. 19, 2023, which claims priority to French Patent Application FR2203630, filed Apr. 20, 2022, the contents of which are incorporated herein by reference.

BACKGROUND

The present invention relates to a method for manufacturing a strip of composite material intended to form a tubular structure, the method comprising the following steps:

butting together end regions of unconnected strip parts, each strip part being formed of a polymer matrix and fibers or film embedded in the matrix, applying heat and pressure to produce a welded joint between the end regions.

Such a strip of composite material is intended, for example, to form the tubular structure of a pipe, in particular a Thermoplastic Composite Pipe (TCP), or a Hybrid Flexible Pipe (HFP).

Such tubular structures are manufactured by winding at least one strip of composite material around a support and welding the successive strip windings together with a high-temperature weld, for example using a laser.

Such a technique is particularly suitable when the composite strip comprises a polyetheretherketone (PEEK) matrix that provides tubular structures with excellent mechanical properties, in conjunction with the reinforcing fibers it contains.

Such pipes thus present the advantage of being lightweight, yet highly resistant to internal pressure within the pipe, or to external pressure applied to the pipe.

Composite strips intended for forming such internal structures are currently produced by fabricating several strip parts from a single piece, then butt-welding the strip parts together to produce a strip of greater length, which is compatible with the length of the pipe to be produced.

A welded joint is formed between the free ends of successive strip parts. In this respect, WO2021/094718 describes a method for making welds on composite strip parts. The end regions of the strip parts are brought together and butt-welded together after heating Is applied.

Even if the welding is carried out with great care, any significant variation in thickness at the joint can lead, when the strip windings are exposed to the laser, in order to produce the tubular structure, to a local temperature increase at the joint, which can reach over 550° C.

At this temperature, flash phenomena or local combustion can occur. Combustion debris, contaminants or holes are then formed around the joint. In addition, crack initiation and/or adhesion defects may appear in this zone.

These phenomena occurring at the joints between strip parts are therefore troublesome, as the maximum achievable length of a unitary strip part is generally around 500 m, which implies several joints along the strip, if the latter is of substantial length.

SUMMARY

One aim of the invention is therefore to provide a method for manufacturing a composite material strip from butt-joined unit strip parts, without adhesive or glue, in which subsequent welding of the composite strip to form a tubular structure is not substantially affected by the presence of joints between the unit strip parts.

To this end, the subject matter of the invention is a method for manufacturing as defined above, characterized in that at least one end region presents a rear zone in which the lateral edges of the strip part are parallel to one another, and a front zone projecting from the rear zone, the front zone being delimited by two lateral edges each presenting at least one point, in particular at least one segment, positioned at a distance from a respective extension of each lateral edge of the rear zone, between the respective extensions of each lateral edge of the rear zone, the front zone of an end region of a first strip part being located facing an end region of a second strip part when the end regions are butted together.

The method according to the invention may comprise one or more of the following features, taken alone or in any technically possible combination:

the application of heat and pressure includes heating by induction of a heating region of a metal support on which the end regions of the strip parts are arranged;

the method comprises arranging an induction coil facing the heating region of the metal support, and circulating a variable electric current through the induction coil to generate by Joule effect heat by currents induced in the heating region;

the method comprises the displacement of a pressure-applying wedge on the heating region, and applying pressure to the end regions of the strip parts between the metal support and the wedge;

when butting together the end regions, at least one lateral edge of the front zone is an inclined lateral edge, the angle of inclination of the inclined lateral edge relative to the longitudinal axis of the strip part in the end region is between 20° and 80°, in particular between 30° and 60°, even more particularly between 35° and 55°;

when butting together the end regions, the front zone of the end region comprises an inclined lateral edge and an additional inclined lateral edge, the additional inclined lateral edge being inclined relative to the longitudinal axis of the strip part by an angle of inclination opposite to the angle of inclination of the inclined lateral edge relative to the longitudinal axis of the strip part;

the additional inclined lateral edge intersects the inclined lateral edge at an end point of the strip part;

each end region presents a rear zone in which the lateral edges of the strip part are parallel to one another, and a front zone projecting from the rear zone, the front zone being delimited by two lateral edges each presenting at least one point, in particular at least one segment, positioned at a distance from a respective extension of each lateral edge of the rear zone, between the respective extensions of each lateral edge of the rear zone, the front zone of an end region of a first strip part being located facing the rear zone of an end region of a second strip part when the end regions are butted together the application of heat and pressure to weld the end regions together is carried out without the application of material, in particular without the application of a film to the surface of each end region;

when the end regions are butted together, the overlap between the end region of a first strip part and the end region of a second strip part, measured along the longitudinal axis of each end region, is greater than 10 mm, and in particular between 15 mm and 30 mm;

the matrix is made of a polymer selected from among the PEK (polyetherketone), the PEEK (polyetheretherketone), the PEEKK (polyetheretherketoneketone), the PEKK (polyetheretherketone), the PEKEKK (polyetherketoneetherketoneketone), the PAI (polyamide-imide), the PEI (polyether-imide), the PSU (polysulfone), the PPSU (polyphenylsulfone), the PES (polyether sulfone), the PAS (polyarylsulfone), the PPE (polyphenylene ether), the PPS (polyphenylene sulfide), the LCP (liquid crystal polymers), the PPA (polyphthalamide), their copolymers and/or mixtures thereof, and wherein the fibers are selected from among carbon fibers, glass fibers, aramid fibers, and/or basalt fibers, the fibers advantageously forming a mat, or wherein the film is a polyketone yarn, in particular unfilled PEEK (polyetheretherketone).

The invention also has as its object the use of at least one strip of composite material produced by the method for manufacturing such as defined above to form, advantageously by winding and heating, a tubular structure, in particular a tubular structure of a flexible pipe.

The invention also has as its object an installation for manufacturing a strip of composite material intended to form a tubular structure, the installation comprising:

a supply or manufacturing station able to supply unconnected strip parts, each strip part being formed from a polymer matrix and fibers embedded in the matrix, a welding station including a support presenting a heating region intended for butting together the end regions, and a heat and pressure application device for producing a welded joint between the end regions, characterized in that the supply and manufacturing station includes a cutting apparatus configured to form at least one end region presenting a rear zone in which the lateral edges of the strip part are parallel to each other, and a front zone projecting from the rear zone, the front zone being delimited by two lateral edges each presenting at least one point, in particular at least one segment, positioned at a distance from a respective extension of each lateral edge of the rear zone, between the respective extensions of each lateral edge of the rear zone.

The installation according to the invention may comprise one or more of the following features, taken alone or in any technically possible combinations:

the support is a metal support, the heat and pressure application device being able to heat by induction the heating region of the metal support on which the end regions of the strip parts are arranged, the heat and pressure application device comprising an induction coil positioned facing the heating region of the metal support, and a variable electric current source able to supply the induction coil to generate, by the Joule effect, heat by currents induced in the heating region;

the heat and pressure application device comprises a movable pressure applying wedge on the heating region, able to apply pressure to the end regions of the strip parts between the metal support and the wedge;

the cutting apparatus includes a base defining a groove for receiving a strip part, and a cutting wedge, mounted movably relative to the base between a position for loading/unloading a strip part and a position for cutting the strip part, the cutting apparatus advantageously including guides for displacing the cutting wedge.

DESCRIPTION OF THE FIGURES

The invention will be better understood on reading the following description, given by way of example only, and made with reference to the appended drawings, on which.

DETAILED DESCRIPTION

A method according to the invention is intended to manufacture a strip 2 of composite material, an example of which is partially represented in FIG. 1, and which will hereinafter be referred to as a "composite strip".

Figure 6:
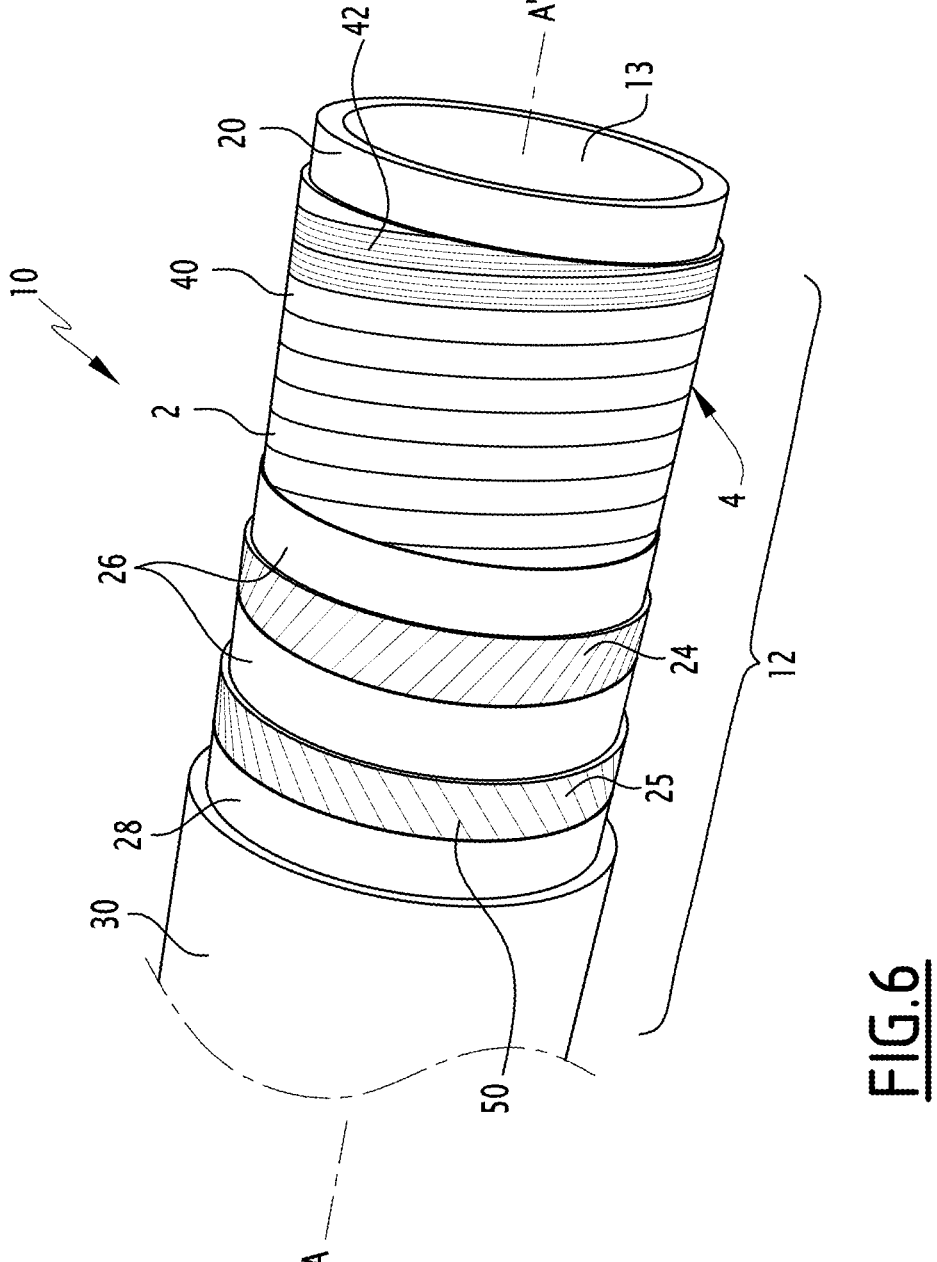
FIG. 6 is a partially exploded perspective view of one example of a flexible pipe including a tubular structure produced from a plurality of composite strips obtained by the method according to the invention.

The composite strip 2 is intended to be wound and welded to produce a tubular structure 4, in particular, an internal tubular structure 4 of a flexible fluid conveying pipe 10, an example of which can be seen in FIG. 6.

The flexible pipe 10 is, for example, a Thermoplastic Composite Tube (TCP) or a Hybrid Flexible Pipe (HFP) in the example of FIG. 6.

The tubular structure is, for example, a tubular structure 4 for reinforcing the flexible pipe 10.

The flexible pipe 10 includes a central section 12, illustrated in part in FIG. 6. It includes, at each axial end of the central section 12, an end fitting (not visible).

With reference to FIG. 6, the pipe 10 delimits an internal passage 13 for the circulation of a fluid, advantageously a petroleum fluid. The internal passage 13 extends along an axis A-A', between the upstream end and the downstream end of the pipe 10. It opens out through the end fittings.

The flexible pipe 10 is intended to be arranged across a body of water in a fluid production installation, particularly for hydrocarbons. The body of water is, for example, a sea, lake or ocean. The depth of the body of water below the fluid exploitation installation is, for example, between 500 m and 4000 m. The fluid exploitation installation includes a surface assembly and a bottom assembly (not shown) or two surface assemblies which are advantageously connected to each other by the flexible pipe 10.

The surface assembly is floating, for example. It is advantageously formed by a floating production, storage and offloading (FPSO) unit, a floating liquefied natural gas (FLNG) unit, a semi-submersible platform or an offloading buoy. Alternatively, the surface assembly can be a rigid, fixed jacket type structure or an oscillating structure attached to the seabed, for example a TLP (Tension Leg Platform).

In this example, the flexible pipe 10 is a partially or fully submerged riser connecting the bottom assembly to the surface assembly. Alternatively, the flexible pipe 10 is fully immersed in the water body and connects, for example, two bottom assemblies (not shown) to each other.

Another alternative consists of a flexible pipe 10 partially submerged in the water body connecting, for example, two surface assemblies (typically an offloading buoy and an FPSO). This is particularly the case with flexible OOL (Oil Offloading Line) lines.

As illustrated in FIG. 6, the pipe 10 delimits a plurality of concentric layers around the axis A-A', which extend continuously along the central section 12 to the end fittings located at the ends of the pipe.

In the example of FIG. 6, the pipe 10 includes at least one inner tubular sheath 20 based on a polymer material, advantageously constituting a pressure sheath, and the reinforcement tubular structure 4, applied around the tubular sheath 20 by being bonded thereto. Alternatively, the pipe 10 is devoid of the internal tubular sheath 20, the reinforcement tubular structure 4 therefore being watertight.

The pipe 10 also advantageously includes a plurality of layers of tensile armor 24, 25 arranged externally relative to the reinforcement tubular structure 4 by not being connected to the reinforcement tubular structure 4.

Advantageously, and according to the desired use, the pipe 10 also includes anti-wear layers 26, interposed between the reinforcement tubular structure 4 and the tensile armor layers 24, 25, as well as within the tensile armor layers 24, 25. It also advantageously includes a reinforcement ribbon 28, wound around the tensile armor layers 24, 25 and an outer sheath 30, intended to protect the pipe 10.

As known, the tubular sheath 20 is intended to seal off the fluid transported in the passage 13. The tubular sheath 20 also has as its function the protection of the reinforcement tubular structure 4 from abrasion caused by the presence of abrasive particles, for example sand, within the fluid conveyed through the passage 13.

The tubular sheath 20 is formed of a polymer material, preferably thermoplastic. For example, the polymer forming the tubular sheath 20 is based on a polyolefin such as polyethylene, on a polyamide such as PA11 or PA12, or on a fluoropolymer such as polyvinylidene fluoride (PVDF).

Alternatively, the tubular sheath 20 is formed from a high-performance polymer such as the PEK (polyetherketone), the PEEK (polyetheretherketone), the PEEKK (polyetheretherketoneketone), the PEKK (polyetherketoneketone), the PEKEKK (polyetherketoneetherketoneketone), the PAI (polyamide-imide), the PEI (polyether-imide), the PSU (polysulfone), the PPSU (polyphenylsulfone), the PES (polyethersulfone), the PAS (polyarylsulfone), the PPE (polyphenyleneether), the PPS (polyphenylene sulfide), the LCP (liquid-crystalline polymers), the PPA (polyphthalamide) and/or mixtures thereof, or blends with the PTFE (polytetrafluoroethylene) or the PFPE (perfluoropolyether).

The thickness of the tubular sheath 20 is, for example, between 1 mm and 20 mm.

The tubular sheath 20 is formed from a tube of polymer material, a strip of assembled polymer material, or an impregnated polymer mat.

When the tubular sheath 20 is formed from a tube, it is advantageously obtained by extrusion of a thermoplastic tube chosen in particular from among the polymers mentioned above.

When the tubular sheath 20 is formed from a strip of assembled polymer material, it is advantageously produced by extruding and winding thermoplastic strips of a polymer as described above. Preferably, the turns of a first layer are contiguous (edge-to-edge without overlap), and the turns of an upper layer are arranged so as to have an overlap of two adjacent lower strips ensuring the seal of the tubular sheath 20.

According to the preferred embodiment, the flexible pipe 10 has no internal carcass, and is referred to as a "smooth bore". The inner surface of the tubular sheath 20 directly delimits the internal passage 13.

According to one alternative not shown, the flexible pipe includes an internal carcass located inside the tubular sheath 20 and is referred to as a "rough bore". The function of the internal carcass is to increase the crush resistance of the flexible pipe, and it is formed, for example, by a profiled, spirally wound metal strip. Advantageously, the turns of the strip are hooked to one another, which allows crushing forces to be absorbed.

In the example represented in FIG. 6, the flexible pipe 10 includes an inner armor layer 24 and an outer armor layer 25, around which the outer sheath 30 is arranged.

Each armor layer 24, 25 includes longitudinal armor elements 50 wound with a long pitch around the axis A-A' of the pipe.

"Wound with a long-pitch" means that the absolute value of the helix angle relative to the A-A' axis is less than 50° and is typically between 25° and 45°.

The armor elements 50 of a first layer 24 are generally wound according to an opposite angle relative to the armor elements 50 of a second layer 25. Thus, if the winding angle relative to the axis A-A' of the armor elements 50 of the first layer 24 is equal to +φ, with φ being between 25° and 45°, the winding angle relative to the axis A-A' of the armor elements 50 of the second layer 25 arranged in contact with the first layer 24 is, for example, −φ, with φ between 25° and 45°.

The armor elements 50 are formed, for example, by metal wires. Alternatively, the armor elements 50 are formed by flat composite wires or ribbons reinforced with carbon fibers.

The reinforcement tubular structure 4 may present a low tensile strength and tend to elongate under the effect of axial forces, the armor layers 24, 25 take up the axial forces and thus prevent elongation of the tubular structure 4.

The outer sheath 30 is intended to prevent fluid permeation from the outside of the flexible pipe 10 to the inside. Advantageously, it is produced in a polymer material, in particular based on a polyolefin material such as polyethylene, a polyamide based material such as PA11 or PA12, or a fluoropolymer based material such as polyvinylidene fluoride (PVDF).

The thickness of the outer sheath 30 is, for example, between 5 mm and 15 mm.

Each anti-wear layer 26 is formed, for example, of PA (polyamide), PE (polyethylene), PVDF (polyvinylidene fluoride), PEEK (polyetheretherketone), PEKK (polyetherketoneketone). An anti-wear layer 26 is arranged between the reinforcement tubular structure 4 and the first tensile armor layer 24. A further anti-wear layer 26 is positioned between each pair of armor layers 24, 25, advantageously as specified in API Standard 17J, 4th edition May 2014.

The reinforcement ribbon 28 is formed, for example, of a high-strength anti-buckling layer. This layer is made of aramid, for example. The ribbon is wound around the outermost armor layer 25, between the armor layer 25 and the outer sheath 30, advantageously as shown in API Standard 17J, 4th edition May 2014.

In this example, the reinforcement tubular structure 4 is applied directly to the tubular sheath 20. It is assembled on the tubular sheath 20 to form a bonded assembly with the tubular sheath 20.

The reinforcement tubular structure 4 is a composite structure. It includes at least one, preferably a plurality of laminated composite reinforcement layers, and optionally, an anti-delamination layer interposed between at least two reinforcement layers.

Each laminated reinforcement layer includes a superposition of composite reinforcement layers. The thickness of each composite layer is generally between 0.10 mm and 0.30 mm, for example between 0.12 mm and 0.17 mm, or between 0.22 mm and 0.27 mm.

In the example represented in FIG. 6, each composite reinforcement layer includes a polymer matrix 40 and the reinforcement fibers 42 embedded in the matrix 40. Alternatively, at least one composite reinforcement layer includes a film embedded in the polymer matrix 40.

Preferably, the matrix 40 is formed from a polymer, particularly a thermoplastic polymer. The polymer of the tubular sheath 20 is advantageously of the same type as that of the matrix 40. By "of the same type" is meant, for the purposes of the present invention, that the polymer of the tubular sheath 20 and the polymer of the matrix 40 are able to melt and form a homogenous mixture, without phase separation, after cooling.

For example, the polymer forming matrix 40 is based on a polyolefin such as polyethylene, based on a polyamide such as PA11 or PA12, or based on a fluoropolymer such as polyvinylidene fluoride (PVDF).

Alternatively, the matrix 40 is formed based on a high-performance polymer such as the PEK (polyetherketone), the PEEK (polyetheretherketone), the PEEKK (polyetheretherketoneketone), the PEKK (polyetherketoneketone), the PEKEKK (polyetherketoneetheretherketoneketone), the PAI (polyamide-imide), the PEI (polyether-imide), the PSU (polysulfone), the PPSU (polyphenylsulfone), the PES (polyethersulfone), the PAS (polyarylsulfone), the PPE (polyphenyleneether), the PPS (polyphenylene sulfide), the LCP (liquid-crystalline polymers), the PPA (polyphthalamide) and/or their mixtures thereof, or blends with the PTFE (polytetrafluoroethylene) or the PFPE (perfluoropolyether).

The reinforcement fibers 42 are, for example, carbon fibers, glass fibers, aramid fibers and/or basalt fibers.

The reinforcement fibers 42 generally have a maximum tensile strength greater than 2 GPa, advantageously greater than 3 GPa and for example between 3 GPa and 6 GPa, such as measured at 23° C. according to ASTM Standard D885M—10A(2014)e1.

In the present application, the terms "ultimate tensile strength" and "tensile strength" have the same meaning and refer to the ultimate tensile strength measured in a tensile test applied according to the longitudinal direction of the reinforcing fibers.

In addition, the reinforcement fibers 42 advantageously present a tensile modulus greater than 50 GPa, ranging for example, between 70 GPa and 500 GPa, in particular between 50 GPa and 100 GPa for glass fibers, between 100 GPa and 500 GPa for carbon fibers and between 50 GPa and 200 GPa for aramid fibers, as measured at 23° C. according to ASTM Standard D885M—10A(2014)e1.

In the present application, the terms "tensile modulus", "Young's modulus" and "tensile modulus of elasticity" have the same meaning and refer to the elastic modulus measured in a tensile test.

The density of the reinforcement fibers 42 is generally between 1.4 g/cm³ and 3.0 g/cm³.

For example, the reinforcement fibers 42 are arranged unidirectionally in the matrix 40. Therefore, they are parallel to one another. Alternatively, the reinforcement fibers 42 are crossed according to two orthogonal directions or are even arranged randomly in the matrix (not shown).

The diameter of the reinforcement fibers 42 is, for example, less than 100 microns, and is notably between 4 microns and 10 microns for carbon reinforcing fibers.

Figure 1:
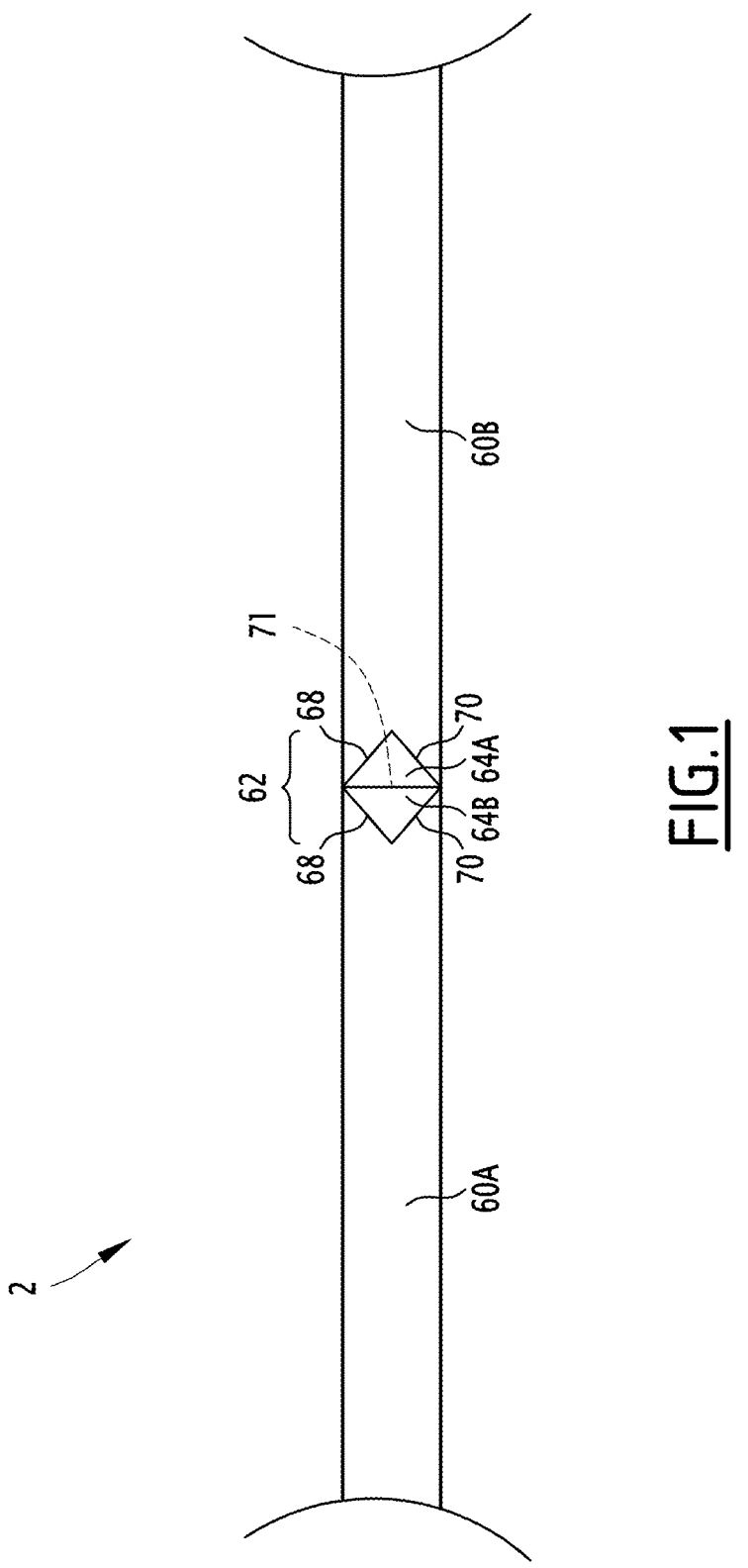
FIG. 1 is a schematic view of a composite material strip obtained by the method for manufacturing according to the invention.

Preferably, each composite reinforcement layer of the tubular structure 4 is formed by winding at least one composite strip 2 manufactured by the method according to the invention, an example of which can be seen in FIG. 1.

Each composite strip 2 presents several layers of fibers 42 embedded in an elongated matrix 40. It presents a length greater than at least 10 times its width and at least 10 times its thickness.

For example, the length of each composite strip 2 is greater than 100 m and is generally between 100 m and 4500 m. In particular, the width of each composite strip 2 is between 6 mm and 50 mm. The thickness of each composite strip 2 is advantageously between 0.1 mm and 1 mm.

Thus at 23° C., each composite strip 2 presents a tensile modulus greater than 10 MPa, in particular between 30 GPa and 170 GPa, such as measured by Standard NF EN 2561, January 1996, an elongation at break greater than 0.3%, in particular between 1% and 5%, such as measured by Standard NF EN 2561, January 1996, and a maximum tensile strength greater than 100 MPa, in particular between 350 MPa and 3500 MPa, such as measured by Standard NF EN 2561, January 1996.

Advantageously, each composite strip 2 comprises a PEEK or a PVDF matrix reinforced with unidirectional carbon fibers oriented parallel to the longitudinal axis of the strip.

As will be seen below, during the production of each reinforcement layer, the or each composite strip 2 is helically wound around the axis A-A' of the tubular sheath 20 and is heated to cause partial melting of the matrix 40, and bonding with the successive turns of the composite strip 2, and/or with adjacent layers which may be other reinforcement layers, anti-delamination layers or the tubular sheath 20.

The absolute value of the winding helix angle $\gamma$ of each composite strip 2 relative to the axis A-A' of the pipe 10 is, for example, between 50° and 85°, preferably between 55° and 80°. This ensures elongation of the composite under the effect of the internal pressure, and adequate cooperation with the armor layers 24, 25.

The combination of a winding angle $\gamma$ of the composite strips 2 with an absolute value of between 50° and 85°, advantageously between 55° and 80°, preferably between 60° and 80°, with a winding angle $\varphi$ of the reinforcement elements 50 with an absolute value of between 25° and 45°, prevents elongation of the reinforcement tubular structure 4 through the compensating effect produced by the reinforcement layers 24, 25.

The optimum combination between the winding angles $\gamma$, $\varphi$ drastically reduces the stresses in the tubular assembly formed by the inner sheath 20 and the reinforcement tubular structure 4, and therefore the thickness required to resist bending, internal pressure and/or collapse forces.

In addition, thanks to the axial stiffness of the reinforcement tubular structure 4, the tensile armor layers 24, 25, in cooperation with the reinforcement tubular structure 4, are more resistant to axial compression under the external pressure conditions of the deep sea.

In addition, the winding angle φ of the reinforcement elements 50, with an absolute value of between 25° and 45°, taken in combination with the angle γ of winding of the composite strips 2, with an absolute value of between 50° and 85°, allows compression of the reinforcement tubular structure 4, reducing the minimal bending radius ("MBR").

The permissible tensile deformation at the extrados of the tubular assembly formed by the inner sheath 20 and the reinforcement tubular structure 4 is greater than 1%, advantageously greater than 2%, preferably greater than 3%. This deformation induces the winding radius compatible with most manufacturing and installation equipment.

According to the invention, with reference to FIG. 1, the composite strip 2 is formed from a plurality of strip parts 60A, 60B which are butted together by welding to form a joint 62.

The number of strip parts 60A, 60B butted together to form a strip 2 is, for example, greater than or equal to 2, and is in particular between 2 and 20.

The number of strip parts 60A, 60B may be equal to 2, in particular when a strip 2 breaks during manufacture, or if a visible defect in the strip 2 is noticed when the machine is at a standstill.

The number of strip parts 60A, 60B can be greater, in particular when manufacturing a long strip 2, for example greater than 350 m, and in particular, of the order of 1000 m. In this case, at least 3 strip parts 60A, 60B of the order of 300 m are assembled.

Figure 2:
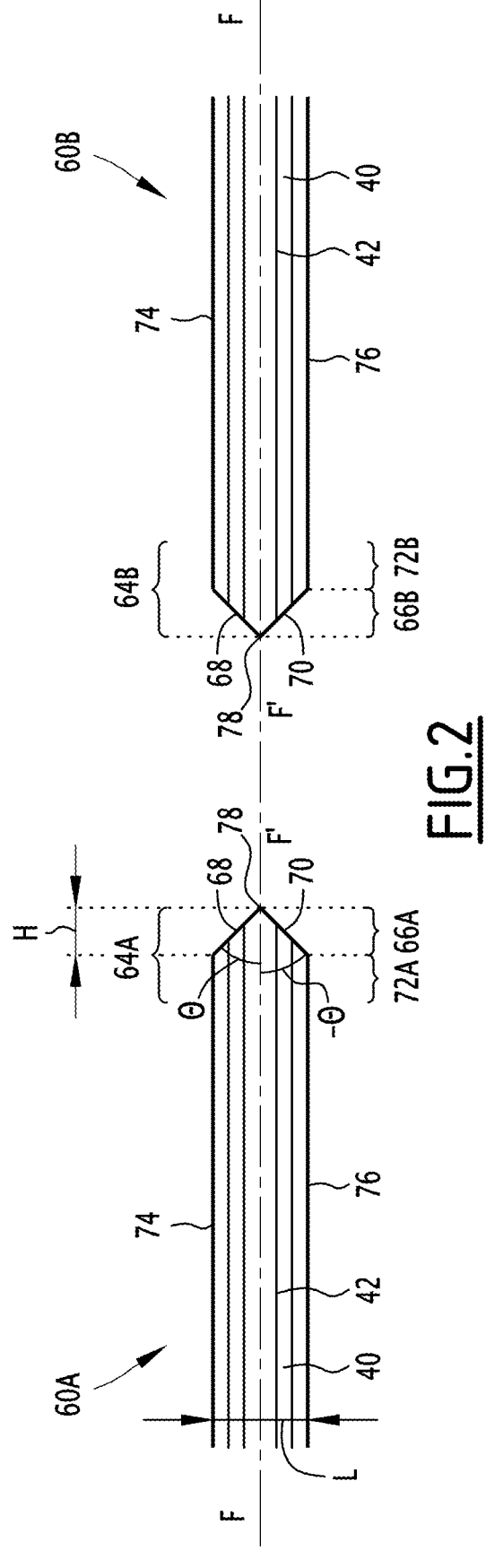
FIG. 2 is a schematic view of two parts of composite strip intended to be butt-welded together when implementing the method according to the invention, each strip part presenting a free end region in the form of a tip

As illustrated in FIG. 2, each strip part 60A, 60B includes a polymer matrix 40, and reinforcement fibers 42, as described above.

Each strip part 60A, 60B presents an end region 64A, 64B intended to be applied to the end region 64B, 64A of another strip part 60B, 60A to form the joint 62 by welding.

In the example illustrated in FIG. 2, each end region 64A, 64B comprises a male front zone 66A, 66B presenting at least one edge 68, 70 inclined relative to a longitudinal axis F-F' of the strip part 60A, 60B. It also presents a rear zone 72A, 72B presenting lateral edges 74, 76 parallel to each other and parallel to the axis F-F', the rear zone 72A, 72B being intended to be brought into contact with the front zone 66B, 66A of another strip part 60B, 60A.

As will be seen below, the superimposition of the two end regions 64A, 64B having a male front zone 66A, 66B allows surprisingly, despite the increase in thickness relative to the male-female splicing, to nevertheless obtain an assembly that retains adequate flexibility for winding and unwinding the strip 2.

The excess thickness is symmetrically distributed and reaches its maximum at an imaginary line 71, which is the intersection of the two male front zones 66A and 66B. However, this excess thickness is much less than in the case of overlapping end regions without a bevel. Furthermore, the shear stress decreases towards the imaginary line 71 and increases up to the tip of the front zone 66A, 66B.

In this example, the length of the end region 64A, 64B is greater than 5 mm, in particular, greater than 10 mm, and is, for example, between 15 mm and 25 mm. This length corresponds to the length of the joint 62 on the composite strip 2 obtained after welding.

Preferably, each front zone 66A, 66B presents a length H between ⅓ of the width L of the rear zone 72A, 72B and the width L of the rear zone 72A, 72B.

In particular, this length H is between 5 mm and 15 mm, in particular between 8 mm and 12 mm.

The width L is advantageously between 10 mm and 30 mm, in particular 12 mm, 18 mm, 22 mm or 25 mm.

Thus, each joint 62 presents a minimal excess thickness, while maintaining sufficient tensile strength and curvature during installation.

As will be seen below, such a configuration keeps the energy of the laser beam intended to assemble the reinforcement tubular structure 4 substantially constant, despite the local excess thickness.

This unexpectedly avoids varying the energy of the laser beam following a change in the thickness of the strip 2, and therefore generating a variation in the heating temperature of the strip 2, which can recurrently reach 550° C.

The problems associated with overheating or underheating are therefore largely avoided. It is well known that the slightest overheating can generate flashes, or conversely, the slightest underheating can lead to insufficient melting of the strip (unconsolidated or glued, resulting in delamination or bubbling).

Another surprising advantage of superimposing the end regions 64A, 64B presenting the male front zones 66A, 66B is that the reinforcement fibers 42 are bonded over a sufficient length to withstand stresses. The excess matrix 40 fills and impregnates the shorter fibers 42 across the width at a distance from the center, as if there were no joint. Surprisingly, micrographic cross-sections of the joint 62 show no singularity.

Each front zone 66A, 66B projects from the respective rear zone 72A, 72B. It is delimited by two lateral edges 68, 70, each of which presents at least one point, in particular at least one segment, positioned at a distance from the respective extension of each lateral edge 74, 76 of the rear zone 72A, 72B.

The front zone 66A, 66B thus presents at its free end a width strictly less than that of the rear zone 72A, 72B. Advantageously, the width of the front zone 66A, 66B decreases continuously from the rear zone 72A, 72B toward the free end.

Advantageously, each front zone 66A, 66B includes an inclined edge 68 and an additional inclined edge 70 extending on either side of the longitudinal axis F-F'. In this example, the inclined edge 68 and the additional inclined edge 70 intersect on the strip part 60A, 60B and together define an end point 78 of the strip part 60A, 60B. The front zone 66A, 66B thus presents a triangular shape having the end point 68 as its vertex.

The angle of inclination θ of the inclined edge 68 relative to the longitudinal axis F-F' is, for example, between 20° and 80°, in particular, between 30° and 60°, even more particularly between 35° and 55°.

The additional inclined edge 70 advantageously presents an angle of inclination −θ opposite to the angle of inclination θ of the inclined edge 68.

The angle of inclination −θ of the additional inclined edge 70 is, for example, between −20° and −80°, in particular between −30° and −60°, even more particularly between −35° and −55°.

The length H of the front zone 66A, 66B, taken along the axis F-F' between the end point 78 and the projection on the axis F-F' of the points of intersection of the inclined edges 68, 70 with the respective lateral edges 74, 76, is equal to the length of the rear zone 72A, 72B intended to receive the front zone 66B, 66A of the other strip part 60B, 60A.

Figure 3:
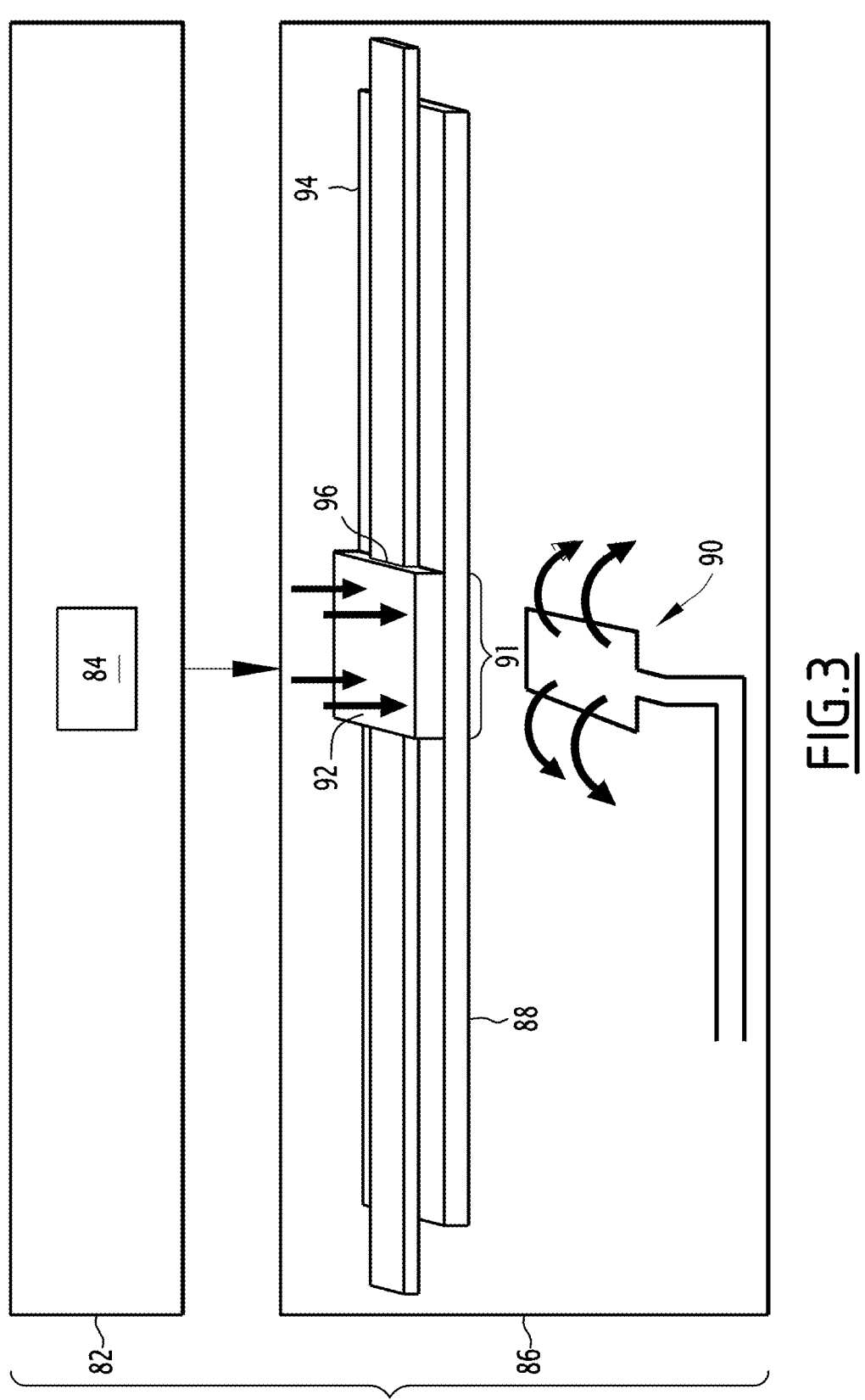
FIG. 3 is a partial schematic perspective view of a welding station of a first installation for manufacturing composite strips according to the invention.

The method for manufacturing the strip 2 is implemented in a manufacturing installation represented schematically in FIG. 3.

The installation advantageously includes a station 82 for supplying or manufacturing the strip parts 60A, 60B, comprising if necessary a device 84 for cutting each inclined edge 68, 70. The installation includes a welding station 86 intended to weld together the end regions 64A, 64B thus formed.

The supply or manufacturing station 82 is able to supply or manufacture the strip parts 60A, 60B of composite material presenting a matrix 40 and the fibers 42 as described above.

The maximum length of the strip parts 60A, 60B formed in the station 82 is, for example, less than 5000 m. This length is, for example, greater than 350 m, and in particular between 500 m and 1500 m.

In one embodiment, the contour of the strip parts 60A, 60B initially supplied or manufactured by the station 82 is rectangular. The cutting apparatus 84 is then able to cut each inclined edge 68, 70 in the end region 64A, 64B of each strip part 60A, 60B. Cutting is performed with a blade and/or by laser cutting.

Figure 7:
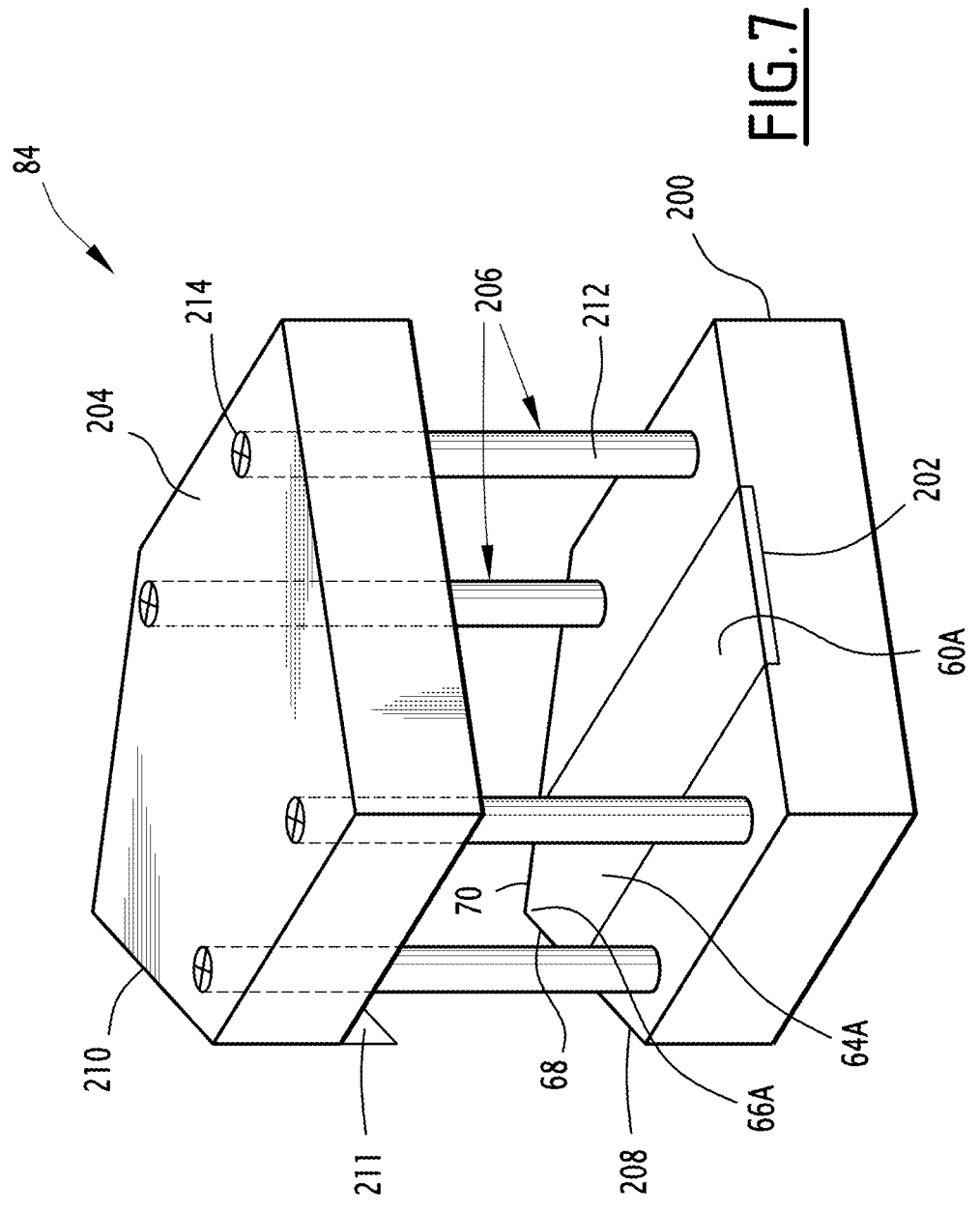
FIG. 7 is a schematic perspective view of a cutting apparatus for producing parts of composite strips intended to be welded together.

In the example illustrated in FIG. 7, the cutting apparatus 84 includes a base 200 defining a groove 202 for receiving a strip part, a cutting wedge 204, mounted movably relative to the base 200 between a position for loading/unloading a strip part 60A, 60B and a position for cutting the strip part 60A, 60B. The cutting apparatus 84 advantageously includes guides 206 for displacing the cutting wedge 204.

The base 200 presents a cutting end 208 with a contour identical to the contour of the front zone 66A, 66B of each end region 64A, 64B.

The cutting wedge 204 also presents a contour cutting end 210 identical to the contour of the front zone 66A, 66B of each end region 64A, 64B. The cutting end 210 is provided with at least one blade 211 projecting toward the base 200 along the contour of the cutting end 210.

The displacement guides 206 are formed, for example, by the parallel rods 212 projecting from the base 200. Each rod 212 is received in a complementary through passage 214 formed through the cutting wedge 204.

To realize the cut, a strip part 60A, 60B initially supplied or manufactured by the station 82 with a rectangular contour, is introduced into the groove 202 of the base 200, with the cutting wedge 204 occupying its loading/unloading position.

The cutting wedge 204 is then passed into its cutting position in the vicinity of the base 200. The blades 211 located at the cutting end 210 cut the lateral edges 68, 70 of the front zone 66A, 66B, along the contour of the cutting end 208 of the base 200.

Alternatively, the strip parts 60A, 60B supplied or manufactured by the station 82 present the or each inclined edge 68, 70 in the end region 64A, 64B of each strip part 60A, 60B. In this case, the installation is devoid of a cutting station 84.

As illustrated in FIG. 3, the welding station 86 includes a metal support 88, intended preferably to be heated by induction, and advantageously at least one induction coil 90 intended to be positioned opposite a heating region 91 of the metal support 88, and at least one movable wedge 92 for applying pressure.

Alternatively, the welding station 86 includes a non-inductive heating device.

The wedge 92 is movable relative to the metal support 88 between a retracted position for positioning the end regions 64A, 64B of the strip parts 60A, 60B and a position for applying pressure to the end regions 64A, 64B of the strip parts 60A, 60B.

The metal support 88 presents an upper surface 94 intended to receive each strip part 60A, 60B in abutment and to bring the end regions 64A, 64B into superimposition on one another in the heating region 91 facing the induction coil 90.

The metal support 88 is made of aluminum or tool steel, for example.

The induction coil 90 is able to be supplied with a variable electric current from a source (not shown), to generate in the heating region 91 of the metal support 88, located facing the coil 90, the induced currents able to heat the metal support 88 by the Joule effect.

The thickness of the metal support 88 up to the surface 94, taken in the heating region 91 facing the induction coil 90, is for example less than 5 mm, and is, in particular, between 1 mm and 3 mm.

The currents induced by the coil 90 in the heating region 91 are able to increase the temperature of the metal support 88 in the heating region 91 to a temperature greater than the melting temperature of the polymer, that is, 340° C., and in particular to a temperature of between 345° C. and 360° C. for a PEEK matrix. The heating by induced current preferably allows to obtain a temperature rise gradient greater than 15° C./s, in particular between 17° C./s and 25° C./s.

This temperature is sufficient to cause at least partial melting of the polymer matrix 40 of the end regions 64A, 64B.

The wedge 92 internally defines an indentation 96 of parallelepiped volume and width corresponding to the width of the strip 2 taken between the parallel lateral edges 74, 76.

The wedge 92 is movable relative to the upper surface 94 of the metal support 88 between the retracted position and the position applied to the metal support 88.

When applied to the surface 94, the wedge 92 applies pressure to the overlapping end regions 64A, 64B, ensuring mixing between the polymer matrices 40 and the reinforcement fibers 42 of each of the end regions 64A, 64B to produce the joint 62 after cooling.

A method for manufacturing the composite strip 2 in the installation will now be described.

Initially, the strip parts 60A, 60B are manufactured separately from each other and/or are supplied to the supply and/or manufacturing station 82.

In the case where the strip parts 60A, 60B initially present a rectangular contour, the end regions 64A, 64B are fed into the cutting apparatus 84 to be cut there and form the inclined edge 68 and the additional inclined edge 70, with the angle of inclination θ or −θ defined above.

Having done this, the strip parts 60A, 60B are arranged on the upper surface 94 of the metal support 88.

In the heating region 91, the front zone 66A of an end region 64A of a first strip part 60A is arranged in contact with, and above, the rear zone 72B of an end region 64B of a second strip part 60B.

As a result, the front zone 66B of the end region 64B of the second strip part 60B is arranged below the rear zone 72A of the end region 64A of the first strip part 60A.

Once this has been done, the welding station 86 is activated to form the joint 62. To this end, an alternating current is supplied to the induction coil 90, which generates induced currents in the metal support 88, and a heating of the upper surface 94 by the Joule effect.

This heating causes at least partial melting of the polymer matrix 40 of the end regions 64A, 64B.

The movable wedge 92 is then displaced from its retracted position to its position applied to the end regions 64A, 64B of the strip parts 60A, 60B. The polymer matrices 40 of the end regions 64A, 64B mix and form the joint 62.

Then, the power supply to the coil 90 being switched off, the polymer matrix 40 in the region of the joint 62 cools and solidifies to form the joint 62.

It should be noted that the trace of the inclined edges 68, 70 of each end region 64A, 64B remains advantageously visible on the outer surface of the strip 2, even after welding.

Figure 4:
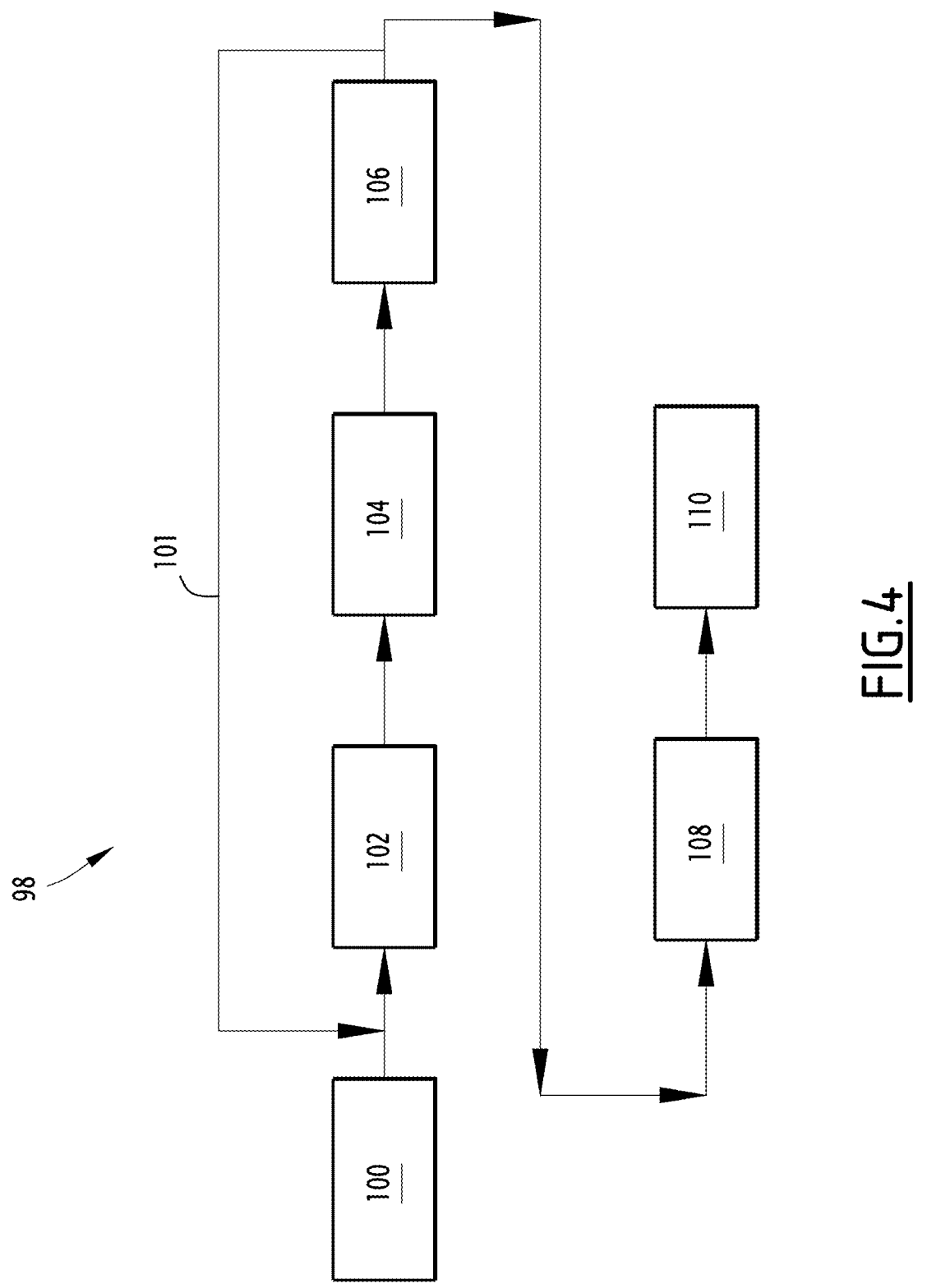
FIG. 4 is a schematic view of a block diagram representing an installation for manufacturing a flexible pipe including a tubular structure made from the composite strip of FIG. 1.

The strip 2 is then wound onto a reel, for use in an installation 98 for manufacturing the flexible pipe 10, represented schematically in FIG. 4.

The installation 98 includes a station 100 for supplying the sheath 20, possibly a pre-compaction station 102, a station 104 for forming the tubular structure 4 and possibly a post-compaction station 106.

The installation 98 advantageously includes a station 108 for winding the armor layers 24, 25 and a station 110 for forming the outer sheath 30.

The station 100 for supplying the sheath 20 is able to manufacture and/or unwind the sheath 20 along a longitudinal axis A-A', with a view to its introduction into successive stations 102, 104, 106. The sheath 20 thus defines a cylindrical outer surface 112 (see FIG. 5) on which the tubular structure 4 is formed.

Figure 5:
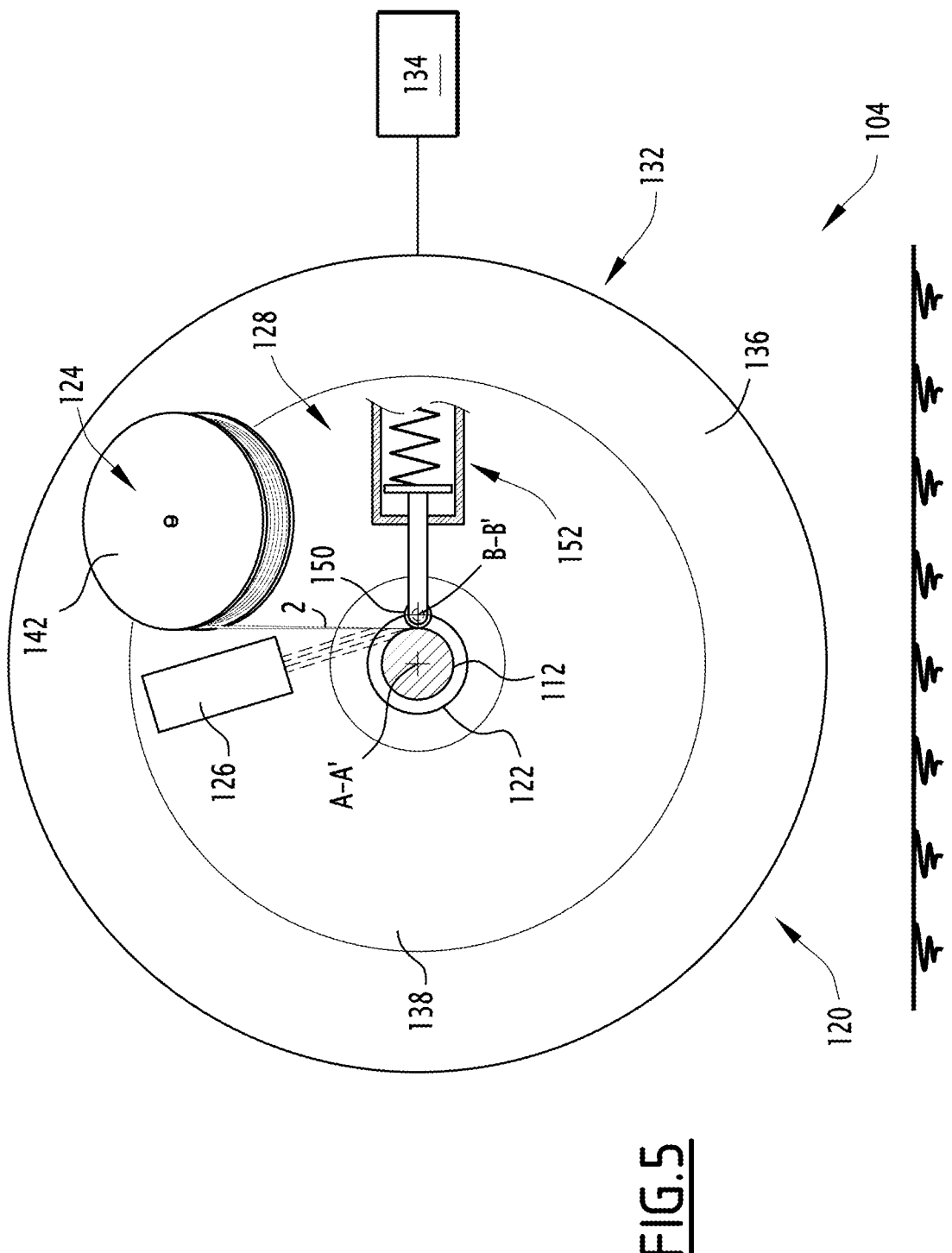
FIG. 5 is a schematic view of a laser welding station for the composite strip manufactured by the method according to the invention.

The forming station 104 is illustrated schematically in FIG. 5. It includes a frame 120 delimiting a central passage 122 for circulation of the sheath 20 along a central axis A-A', a device 124 for parallel winding of a plurality of strips 2 onto the outer surface 112 defined here by the sheath 20, and at least one device 126 for heating the strips 2.

The forming station 104 also includes a compacting device 128.

The frame 120 here includes a fixed structure fixed to the floor, at least one rotary support element formed by a mobile cage 132 mounted movable in rotation on a fixed structure about the central axis A-A', and a mechanism 134 for driving the mobile cage 132 in rotation relative to the fixed structure.

The mobile cage 132 includes a drum 136 rotatable about the central axis A-A' and a support 138 carried by the drum 136 at a distance from the central axis A-A'.

The central passage 122 passes through the drum 136.

The winding device 124 is mounted on the support 138 of the movable cage 132 to be driven in rotation together with the movable cage 132 about the axis A-A'.

The winding device 124 includes a plurality of unwinders 142, and the elements (not shown) for guiding the strips 2 coming from each unwinder 142 to guide them toward the outer surface 112, keeping them parallel.

Each unwinder 142 is able to unwind respectively, at least one strip 2 intended to form a reinforcement layer.

Each unwinder 142 includes at least one reel on which at least one strip 2 is wound.

The guide elements include guides for aligning the strips 2 parallel to one another along an axis inclined relative to the central axis A-A' by an angle equal to the helix angle γ, to allow the strips 2 coming from each unwinder 142 to be wound helically around the outer surface 112 when the mobile cage 132 rotates about the axis A-A'.

The heating device 126 is also carried by the support 138 of the moving cage 132. It is positioned facing the outer surface 112, in the region where the strips 2 are applied to the outer surface 112. It includes, for example, a laser, a lamp, in particular, a xenon lamp, an infrared lamp, a pulsed light device, an ultrasonic welding device and/or a hot air blower device.

The heating device 126 is able to soften, advantageously to melt, the thermoplastic matrix 40 of the strip 2 to allow its complementary application to the outer surface 112.

In this example, the compacting device 128 includes a common frame with the frame 120 of the forming station 104. It includes at least one roller train 150 carried by the movable cage 132 to be driven jointly in rotation with the movable cage 132 about the central axis A-A' relative to the outer surface 112. The compacting device 128 also includes an approach mechanism 152, able to displace each roller train 150 toward the central axis A-A'.

The compacting device 128 is, for example, of the type described in the Applicant's patent application FR3079162 of the Applicant.

A method for manufacturing a tubular structure 4 according to the invention in the installation 98 will now be described, in the example of making a flexible pipe 10.

Initially, the sheath 20 is manufactured and/or supplied in the supply station 100. It is fed to the structure 4 forming station 104 and is displaced in translation through the station 104 for forming the structure 4 along the axis A-A' by a device for driving in translation.

Advantageously, prior to the station 104, the sheath 20 passes through the pre-compaction station 102. The sheath 20 first passes through a heating device 126, to bring its outer surface 112 to a temperature above 100° C., and in particular between 100° C. and 350° C.

The roller trains 150 are driven in rotation around the sheath 20. The rollers are applied to the outer surface 112 to make it as cylindrical as possible.

Then, the sheath 20 is introduced into the central passage 122 of the forming station 104.

In this station 104, a plurality of reinforcement layers are formed from the strips 2.

For each reinforcement layer, a plurality of strips 2 are unwound in parallel from the unwinders 142 of the winding apparatus 124. The guide elements keep the strips 2 parallel to each other, with controlled clearance.

The parallel strips 2 pass in front of the heating device 126, where they are advantageously heated to a temperature of between 150° C. and 450° C., said temperature depending on the nature of the thermoplastic polymer constituting the matrix 40 of the strips 2.

When the matrix 40 of the strips 2 is made of PEEK (melting point around 350° C.), the temperature at which the strips 2 are heated by the heating device 126, is advantageously between 350° C. and 450° C., preferably between 380° C. and 420° C. When the matrix 40 of the strips 2 is made of PVDF (melting point around 180° C.), the temperature at which the strips 2 are heated by the heating device 126 is advantageously between 180° C. and 280° C., preferably between 200° C. and 250° C. This advantageously leads to at least partial melting of the matrix 40.

As the moving cage 132 is driven in rotation about the axis A-A', and the sheath 20 is displaced in translation along the axis A-A', the strips 2 are wound helically around the outer surface 112 defined by the sheath 20 or defined by a layer formed around the sheath 20, with a helix angle equal to γ.

Immediately after winding, the roller train 150, driven in rotation jointly with the moving cage 132, is applied to the strips 2.

The tubular structure 4 thus formed then passes into the post compaction station 106. The outer surface 112 of the tubular structure 4 is then softened as it passes through a heating device and is then compacted again by rotating roller trains 150. The rollers of the roller train 150 roll according to a helical path along the respective strips 2, ensuring minimal disorganization of the reinforcing fibers 42.

Advantageously, the operations of pre-compaction (station 102), formation of the tubular structure (station 104) and post-compaction (station 106) are repeated (loop 101 on FIG. 2) to form further reinforcement layers with other strips 2, as described previously.

Thus, the tubular structure 4 is manufactured layer by layer, with a new outer layer being added at each passage through the station 104, with a thickness substantially equal to that of a strip 2. These operations can be repeated several dozen times, particularly when the thickness of the strip(s) 2 present a thickness significantly less than the final wall thickness of the tubular structure 4.

In addition, the characteristics of the strips 2 and/or the laying and/or compaction parameters can be modified each time a new layer is added. For example, the helix angle of the strips 2 can possibly be modified, in particular, to cross the fibers of two superimposed layers.

The tubular structure 4 then passes through the winding station 108, to allow the armor layers 24, 25 to be positioned.

The armor elements 50 of the tensile armor layers 24, 25 are wound around the reinforcement tubular structure 4, in a manner not bonded to the reinforcement tubular structure 4. Advantageously, an anti-wear layer 26 is interposed between the reinforcement tubular structure 4 and the first tensile armor layer 24, and between each pair of tensile armor layers 24, 25.

Then, advantageously, a reinforcing ribbon 28 is wound around the outermost tensile armor layer 25.

Then, in the outer sheath forming station 110, the outer sheath 30 is formed around the tensile armor layers 24, 25.

The composite strips 2 manufactured by the method according to the invention are therefore particularly suitable for use in the formation of a tubular structure 4 of a flexible pipe 10 in a station 104 comprising a heating device 126, for example a laser.

For the manufacture of the strip 2, the use of a welding station 86 operating by induction, associated with the use of unconnected strip parts 60A, 60B presenting an end region 64A, 64B having at least one inclined edge 68, 70 allows a weld joint 62 to be made between the strip parts 60A, 60B which is robust, while presenting low stiffness, and adequate tensile strength to be unwound from each unwinder 142 and wound onto the outer surface 112.

The presence of the joints 62 realized by welding between the parts of the strips 60A, 60B with the aid of induction heating avoids producing locally high temperatures when passing through the station 104, in particular when this station comprises a laser heating device 126. No flash or combustion effects are observed at the joint 62.

The joint 62 between the strip parts 60A and 60B remains simple and quick to realize, and does not produce holes, debris or areas presenting delamination.

The end regions 64A, 64B of the strip parts 60A, 60B can be easily prepared for welding by simple cutting.

The application of heat and pressure to weld the end regions 64A, 64B together is carried out without applying a film to the surface of each end region 64A, 64B.

This makes it possible to produce a continuous strip of great length, directly usable for the manufacture of tubular structures 4, particularly within a flexible pipe 10 intended for great depths.

In one alternative (not shown), at least one end region 64A, 64B presents a male front zone 66A, 66B which is not necessarily triangular.

The invention claimed is:

1. A composite material strip manufacturing method, the strip being configured to form a tubular structure, the method comprising:

butting together end regions of unconnected strip parts, each strip part being formed of a polymer matrix and fibers embedded in the matrix or a film embedded in the matrix, arranging the end regions of the strip parts on a heating region of a metal support, applying heat and pressure to produce a joint by welding between the end regions, at least one of the end regions having a rear zone having rear zone lateral edges parallel to one another, and a front zone projecting from the rear zone, the front zone being delimited by two front zone lateral edges each presenting at least one point positioned at a distance from a respective extension of each rear zone lateral edge between the respective extensions of each rear zone lateral edge, a front zone of an end region of a first strip part among the strip parts being located facing an end region of a second strip part among the strip parts when butting together the end regions, the applying heat and pressure including heating by induction the heating region of the metal support.

2. The method according to claim 1, comprising arranging an induction coil facing the heating region of the metal support and circulating a variable electric current through the induction coil to generate heat by Joule effect via currents induced in the heating region of the metal support.

3. The method according to claim 2, comprising displacing a wedge in the heating region, and applying pressure to the end regions of the strip parts between the metal support and the wedge.

4. The method according to claim 1, wherein, when butting together the end regions, at least one lateral edge of the front zone is an inclined lateral edge, an angle of inclination of the inclined lateral edge relative to a longitudinal axis of the strip part in the end region being between 20° and 80°.

5. The method according to claim 1, wherein, when butting together the end regions, the front zone of the end region comprises an inclined lateral edge and an additional inclined lateral edge, the additional inclined lateral edge being inclined relative to a longitudinal axis of the strip part by an angle of inclination opposite to an angle of inclination of the inclined lateral edge relative to the longitudinal axis of the strip part.

6. The method according to claim 5, wherein the additional inclined lateral edge intersects with the inclined lateral edge at an end point of the strip part.

7. The method according to claim 1, wherein each of the end regions has a rear zone having rear zone lateral edges parallel to one another, and a front zone projecting from the rear zone, the front zone being delimited by two front zone lateral edges, each front zone lateral edge presenting at least one point positioned at a distance from a respective extension of each rear zone lateral edge between the respective extensions of each rear zone lateral edge, a front zone of an end region of a first strip part among the strip parts being located facing a rear zone of an end region of a second strip part among the strip parts when butting together the end regions.

8. The method according to claim 1, wherein applying heat and pressure to weld the end regions together is carried out without application of material.

9. The method according to claim 1, wherein, when butting together the end regions an overlap between an end region of the first strip part among the strip parts and an end region of the second strip part among the strip parts, measured along a longitudinal axis of each end region is greater than 10 mm.

10. The method according to claim 1, wherein the matrix is made of a polymer chosen from PEK (polyetherketone), PEEK (polyetheretherketone), PEEKK (polyetheretherketoneketone), PEKK (polyetherketoneketone), PEKEKK (polyetherketoneetherketoneketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide), copolymers and mixtures thereof, and wherein the fibers are selected from carbon fibers, glass fibers, aramid fibers, and basalt fibers.

11. A method to form a tubular structure comprising using at least one strip of composite material produced by the manufacturing method according to claim 1.

12. A composite material strip manufacturing installation, the composite strip being configured to form a tubular structure, the installation comprising:

a supply or manufacturing station configured to supply unconnected strip parts, each strip part being formed from a polymer matrix and fibers embedded in the matrix and each having an end region, a welding station including a metal support having a heating region configured to butt weld the end regions, the metal support being configured to permit the end regions of the strip parts to be arranged on the heating region thereof, and a heat and pressure applicator configured to produce a joint by welding the end regions through heating by induction heating of the heating region of the metal support, the supply and manufacturing station including a cutter configured to form at least one end region presenting a rear zone having rear zone the lateral edges parallel to one another, and a front zone projecting from the rear zone, the front zone being delimited by two front zone lateral edges, each front zone lateral edge presenting at least one point positioned at a distance from a respective extension of each rear zone lateral edge between the respective extensions of each rear zone lateral edge.

13. The installation according to claim 12, wherein support is a metal support, the heat and pressure applicator being configured to heat by induction the heating region of the metal support on which the end regions of the strip parts are configured to be arranged, the heat and pressure applicator comprising an induction coil positioned facing the heating region of the metal support, and a variable electric current source able to supply the induction coil to generate by Joule effect, heat by currents induced in the heating region.

14. The installation according to claim 13, wherein the heat and pressure applicator comprises a movable wedge configured to apply pressure on the heating region to the end regions of the strip parts between the metal support and the wedge.

15. The installation according to claim 12, wherein the cutter includes a base defining a groove configured to receive a strip part, a cutting wedge mounted movably relative to the base between a position for loading/unloading a strip part and a position for cutting the strip part.

16. A method of manufacturing a tubular structure, comprising:

forming a composite material strip by butting together end regions of unconnected strip parts, each strip part being formed of a polymer matrix and fibers embedded in the matrix or a film embedded in the matrix, and applying heat and pressure to produce a joint by welding between the end regions, at least one of the end regions having a rear zone having rear zone lateral edges parallel to one another, and a front zone projecting from the rear zone, the front zone being delimited by two front zone lateral edges each presenting at least one point positioned at a distance from a respective extension of each rear zone lateral edge between the respective extensions of each rear zone lateral edge, a front zone of an end region of a first strip part among the strip parts being located facing an end region of a second strip part among the strip parts when butting together the end regions; and forming the tubular structure using the composite material strip.

* * * * *